(12) United States Patent
Bergschneider et al.

(10) Patent No.: US 12,217,087 B2
(45) Date of Patent: Feb. 4, 2025

(54) DYNAMIC SIZING OF SYSTEM AND METHOD FOR PROCESSING FINANCIAL TRANSACTIONS

(71) Applicant: Diebold Nixdorf, Incorporated, North Canton, OH (US)

(72) Inventors: Wolfgang Bergschneider, Salzkotten (DE); Thorsten Brinkmann, Borchen (DE)

(73) Assignee: Diebold Nixdorf, Incorporated, North Canton, OH (US)

( * ) Notice: Subject to any disclaimer, the term of this patent is extended or adjusted under 35 U.S.C. 154(b) by 0 days.

(21) Appl. No.: 18/726,172

(22) PCT Filed: Jan. 20, 2023

(86) PCT No.: PCT/US2023/011230
§ 371 (c)(1),
(2) Date: Jul. 2, 2024

(87) PCT Pub. No.: WO2023/146802
PCT Pub. Date: Aug. 3, 2023

(65) Prior Publication Data
US 2024/0419491 A1   Dec. 19, 2024

Related U.S. Application Data

(60) Provisional application No. 63/303,054, filed on Jan. 26, 2022.

(51) Int. Cl.
*G06F 9/50* (2006.01)

(52) U.S. Cl.
CPC ................................. *G06F 9/50* (2013.01)

(58) Field of Classification Search
CPC ........................................... G06F 9/50
See application file for complete search history.

(56) References Cited

U.S. PATENT DOCUMENTS 10,223,256 B1   3/2019   Schneider et al.
10,296,759 B1   5/2019   Holenstein et al.
(Continued)

OTHER PUBLICATIONS

International Preliminary Report on Patentability filed in the corresponding PCT Application dated Jul. 30, 2024; 10 pages.

(Continued)

*Primary Examiner* — Kristie D Shingles
(74) *Attorney, Agent, or Firm* — Black McCuskey

(57) ABSTRACT

A system for processing a financial transaction request and a method executed by the system can include receiving, at a first server, a request to execute the financial transaction request. The first server can determine transaction middleware (TM) super-modules that are stored on the first server and are required to execute the financial transaction. The first server can detect capacities of the TM super-modules and annex control over memory space of a second server if needed. The first server can replicate at least one of the TM super-modules on the memory of the second server and direct the financial transaction request to the TM super-module replicated on the second server. That TM super-module can generate a corresponding output received by the first server, which can then cede control over the memory space of the second server.

5 Claims, 12 Drawing Sheets

(56) References Cited

U.S. PATENT DOCUMENTS

| | | | |
|---|---|---|---|
| 10,911,952 B1 | 2/2021 | Nasserbakht et al. | |
| 11,178,065 B2 * | 11/2021 | Ignatyev | H04L 47/83 |
| 2013/0262535 A1 | 10/2013 | Hwang et al. | |
| 2017/0206245 A1 | 7/2017 | Zhang et al. | |
| 2017/0322777 A1 | 11/2017 | Malireddy et al. | |

OTHER PUBLICATIONS

Written Opinion filed in corresponding PCT Application No. US202/011230 dated Mar. 15, 2023; 9 Pages.
International Search Report filed in corresponding PCT Application No. US202/011230 dated Mar. 15, 2023; 2 Pages.
Australian Patent Office, Examination Report No. 1 for Standard Patent Application for a non-US patent application that is a family member of the present US application, dated Oct. 1, 2024; 3 pages.

\* cited by examiner

DYNAMIC SIZING OF SYSTEM AND METHOD FOR PROCESSING FINANCIAL TRANSACTIONS

CROSS-REFERENCE TO RELATED APPLICATIONS

This application claims the benefit of U.S. Provisional Patent Application Ser. No. 63/303,054 for DYNAMIC SIZING OF SYSTEM AND METHOD FOR PROCESSING FINANCIAL TRANSACTIONS, filed on 26 Jan. 2022, which is hereby incorporated by reference in its entirety.

BACKGROUND

1. Field

The present disclosure relates to systems for processing financial transactions.

2. Description of Related Prior Art

U.S. Pub. No. 2015/0134953 discloses a METHOD AND APPARATUS FOR OFFERING CLOUD-BASED HSM SERVICES. A HSM service controller receives an administrative request to enable a cloud-based application to have access to a cloud-based HSM service. The HSM service controller segments a cloud-based HSM into a plurality of VHSMs. The HSM service controller allocates to the cloud-based application, a source VHSM from among the plurality of VHSMs. The source VHSM includes an initial set of credentials, roles and/or metadata. The HSM service controller stores a handle for the source VHSM in association with a handle for the cloud-based application. The HSM service controller routes cryptography requests between the cloud-based application and the VHSM based on the handle for the source VHSM and the handle for the cloud-based application. The HSM service controller receives one or more management requests from the cloud-based application and executes cloud administrator functions responsive to the management request.

U.S. Pub. No. 20080301049 discloses a Transaction Management System. The transaction management system includes a plurality of individually identifiable secure container holding facilities constituted by cash acceptance terminals located at the premises of participating merchants and a plurality of individually identifiable secure containers or cash containers, each adapted to dock with and un-dock from a cash acceptance terminal. The merchants, in each transaction, deposit transaction documents such as money, cheques, credit card vouchers or the like into the secure container within the cash acceptance terminal. Cash money fed into the cash acceptance terminal is scanned, validated and counted into the secure container. The cash acceptance terminals include data entry facilities by means of which data pertaining to transactions is recorded in the cash acceptance terminal. The secure containers and the cash acceptance terminals are adapted for bidirectional communication and the data recorded in the cash acceptance terminal is communicated to the secure container. The transaction management system includes a central server in communication with the data processing system of a number of financial institutions. The cash acceptance terminals are programmed to communicate with the server. Purchasers are able to use the cash acceptance terminals as banking facilities and, using a cash acceptance terminal with a facility to recirculate and to dispense cash, the system may be programmed to allow the cash acceptance terminals to dispense cash and credit value, thereby allowing a purchaser to use a cash acceptance terminal like an automated teller machine (ATM) to draw cash, to transfer money between accounts, for bill payment or the like. Using an appropriate tracking and scheduling system, the central server is programmed to record the identity and location of each cash acceptance terminal and every secure container in the system as well as the monetary value stored in or to be obtained from each cash acceptance terminal and secure container in the system which enables the system operator and participating financial institutions to manage the flow of cash within the system without necessarily routing each cash consignment through a cash processing centre or financial institution. The transaction management system is essentially a cash bank with a cash repository that is not constituted by a conventional vault, but by a virtual repository constituted by the secure cash acceptance terminals and secure containers that are all tracked and audited by the system.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system for processing a financial transaction request and a method executed by the system can include maintaining, with one of hardware, software and a combination of hardware and software, on a first server, a plurality of TM sub-modules. A majority of the TM sub-modules can be configured to execute a discrete secondary sub-task of the financial transaction request and can comprise a fully functional and stand-alone JAVA application, build instructions, a default configuration, a DDL/DML implementation, a JAVA document, a OCM plugin, and dependency management information. The first server can also maintain, with one of hardware, software and a combination of hardware and software, a plurality of TM modules. A majority of the TM modules can include at least two of the plurality of TM sub-modules and can be configured to execute a discrete primary sub-task of the financial transaction request, wherein the discrete primary sub-task is completed by the execution of at least two secondary sub-tasks. The first server can also maintain, with one of hardware, software and a combination of hardware and software, a plurality of TM super-modules. A majority of the TM super-modules can include two or more of the plurality of TM modules and can be configured to execute at least part of the financial transaction request by the execution of at least two primary sub-tasks. The method can also include receiving, at the first server, a request to execute the financial transaction request. The method can also include determining, with the first server, all TM super-modules required to execute the financial transaction. The method can also include detecting, with the first server, respective capacities of all of the TM super-modules required to execute the financial transaction as determined in the determining. The method can also include annexing, with the first server, in response to the detecting, control over at least some memory space of a second server physically remote from the first server. The method can also include replicating, with the first server, in response to the detecting, on the at least some of the memory space annexed on the second server, at least one of the TM super-modules required to execute the financial transaction as determined in the determining. The method can also include directing, with the first server, the financial transaction request to the at least one TM super-module replicated on the at least some of the memory space annexed on the second server for completion of at least one primary sub-task. The method can also include completing the at least one primary sub-task, on the second server, with the at least one TM super-module replicated on the at least some of the memory space annexed on the second server and generating a corresponding output. The method can also include receiving, with the first server, from the second server, the output corresponding to completion of the at least one primary sub-task. The method can also include ceding, with the first server, control over the at least some of the memory space annexed on the second server back to the second server after and in response to the receiving of the output.

BRIEF DESCRIPTION OF THE DRAWINGS

The detailed description set forth below references the following drawings.

DETAILED DESCRIPTION

Figure 1:
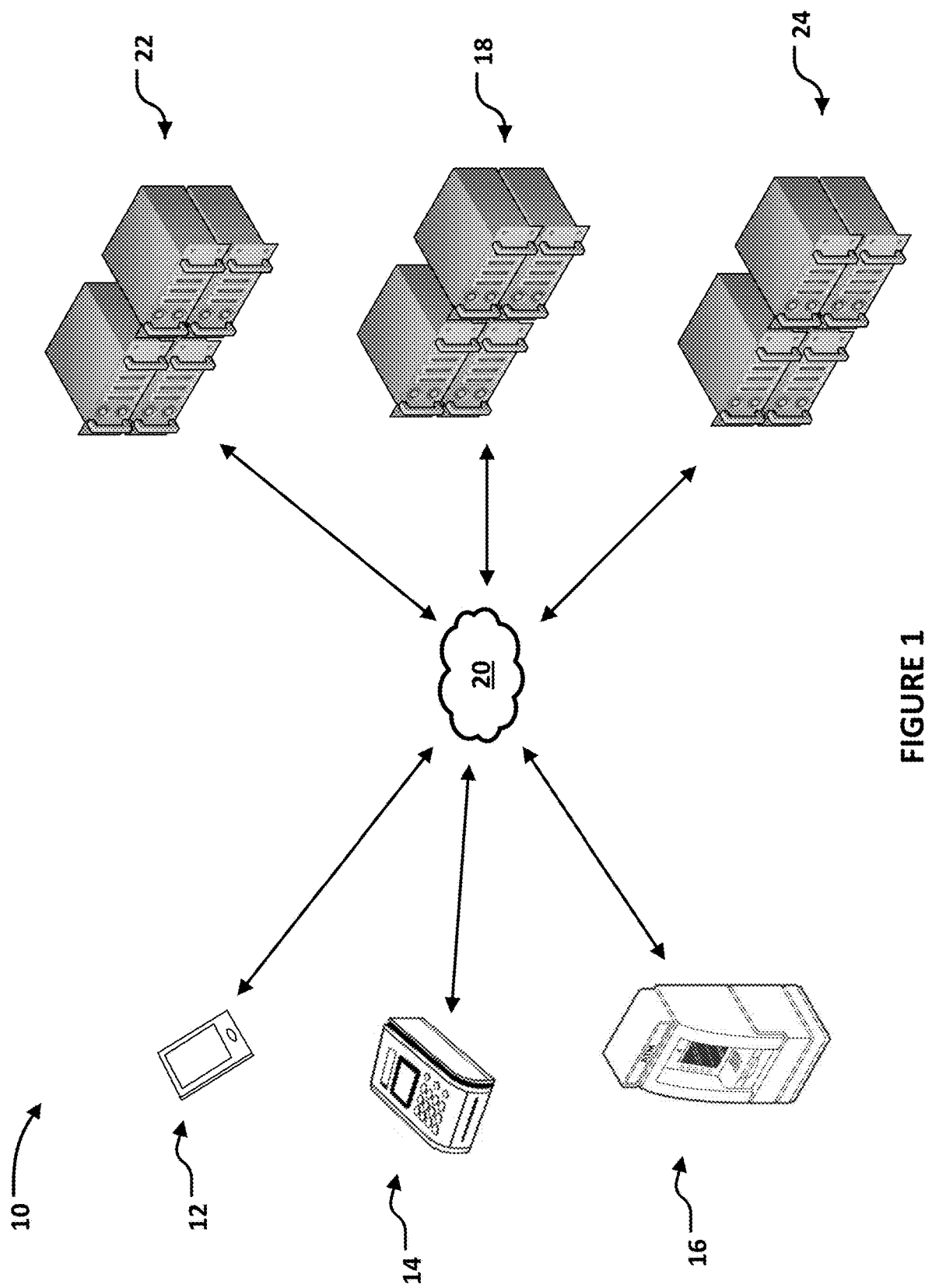
FIG. 1 is a schematic functional block diagram of a super-system of components involved in processing financial transactions and incorporating an exemplary embodiment of the present disclosure.

Similar features are shown in the various embodiments of the present disclosure. Similar features have been numbered with a common reference numeral and have been differentiated by an alphabetic suffix. Similar features are structured similarly, operate similarly, and/or have the same function unless otherwise indicated by the drawings or this specification.

A payment processing solution or system, whether acquiring or issuing, must deal with multiple incoming and outgoing connections. Each incoming channel will have differing properties. For example, ATMs are single point connections, while POS transactions may be processed by network concentrators. Also, incoming issuer traffic may share the same access point as the outgoing external authorization message, and Mobile, Digital and eCommerce channels may use various security mechanisms for authentication. These differences and others must be considered when defining the deployment architecture of a payments processing solution.

The aspects mentioned so far concern the system at runtime. Another important aspect are changes to the flow of the process. Here, business requirements must be introduced quickly and in isolation. To do this, it must be possible to develop, test and deploy changed entities in isolation i.e. without impact to other entities in the system.

The present disclosure, as demonstrated by the exemplary embodiment described below, can provide a system that is configured to process financial transactions and can dynamically change its size in response to demand. FIG. 1 is a schematic functional block diagram of an exemplary system 10 of components so configured and involved in processing financial transactions and incorporating an exemplary embodiment of the present disclosure. The exemplary system 10 includes a plurality of devices that are configured to initiate financial transactions such as, by way of example and not limitation, a personal computing device 12, a point of sale (POS) device 14, and an automated transaction machine (ATM) 16. Single examples of devices configured to initiate financial transactions are shown, but the system 10 can include a plurality of each form of device.

The exemplary personal computing device 12 is shown as a smartphone, but can take other forms such as, by way of example and not limitation, a tablet, a desktop computer, a laptop computer or a smart television. The exemplary POS device 14 is shown as a device in which a payment card can be inserted (cards that include a chip) and in which a payment card can be slid across (cards that include a magnetic strip), but can take other forms. The exemplary ATM 16 is shown as a device in which a check or debit card can be inserted, but can take other forms such as, by way of example and not limitation, a device in which a check or debit card can be slid across, devices that do not require a card, and devices capable of performing transactions more complex than cash withdrawals (referred to as "in-lobby tellers").

The exemplary system 10 also includes a first server 18. The exemplary first server 18 has one or more processors and a non-transitory, computer readable media to store data. The first server 18 can be operated by a financial institution and be configured to operate as a bank core. A bank core is a centralized back-end system designed to process and support transactions across branches of banks and across the devices that are configured to initiate financial transactions such as the personal computing device 12, the POS device 14, and the ATM 16. At the front end, a bank core offers all of the services that customers and banking professionals need to process and execute financial transactions. On the back end, the bank core processes data securely and reduces the risk of fraud. The bank core thus provides essential services to keep data safe and also provides an optimal user experience for customers. Generally, the bank core is a component that participates in the execution of transactions such as assessing deposits and withdrawals for approval, opening new accounts, calculating interest, servicing loans, processing checks, inhibiting fraud and risk, and keeping a ledger of records.

The first server 18 can communicate with the personal computing device 12, the POS device 14, and the ATM 16, respectively, over a network 20. It is noted that only one network 20 is shown, but the first server 18 can communicate with other devices over a plurality of different and/or overlapping networks. The first server 18 can receive requests to assess, for approval or rejection, financial transactions from the personal computing device 12, the POS device 14, and the ATM 16, respectively, over the network 20. The present disclosure is well suited to a wide variety of computer network systems over numerous topologies. Within this field, the configuration and management of large networks comprise storage devices and computers that are communicatively coupled to dissimilar computers and storage devices over a network, such as the Internet. The network 20 can include a local area network (LAN), a wide area network (WAN), e.g., the Internet, a virtual private network (VPN), or a combination thereof.

Transmissions over the network 20 may be encrypted and may include Message Authentication Codes (MACs) to enhance security. MACs can be appended to messages sent from and received by the personal computing device 12, the POS device 14, and the ATM 16. MACs verify that the messages sent and the messages received are identical and also confirm that messages originate from an approved source. The server 18 and the personal computing device 12, the POS device 14, and the ATM 16 can also apply Transport Layer Security (TLS) or Secure Sockets Layer (SSL) protocols and include respective firewalls to enhance security.

It is noted that in other embodiments of the present disclosure, a first server may not receive requests for financial transactions from all forms of devices 12, 14, and 16. For example, the first server may not be bank core and therefore may not manage bank accounts. In such an example, the first server may be configured to process payments for goods and/or services and may only receive requests for financial transactions from the personal computing device 12 and the POS device 14. Also, in other embodiments of the present disclosure, a first server may be a switch of a financial network and communicate with a bank core.

The exemplary system 10 also includes a second server 22. The exemplary second server 22 has one or more processors and a non-transitory, computer readable medium to store data. The exemplary second server 22 is physically remote from the first server 18 and can communicate with the first server 18 over the network 20. It is noted that in other embodiments of the present disclosure, the second server 22 can communicate with the first server 18 over a network different than the network 20 which can include a LAN, a WAN, a VPN, or a combination thereof.

The second server 22 can be configured to operate as a remote platform that uses a virtual, multi-tenant infrastructure to provide the first server 18 with scalable processing sources provisioned dynamically as demanded by the first server 18. The provisioning of the resources of the exemplary second server 22 by the exemplary first server 18 can be accomplished through a web-based interface. When the exemplary first server 18 no longer requires the resources of the exemplary second server 22, the resources are surrendered and accessible to other servers. The purpose of the second server 22 within the system 10 will be described in greater detail below.

The exemplary system 10 also includes a third server 24. The exemplary third server 24 has one or more processors and a non-transitory, computer readable medium to store data. The exemplary third server 24 is physically remote from the first server 18 and can communicate with the first server 18 over the network 20. It is noted that in other embodiments of the present disclosure, the third server 24 can communicate with the first server 18 over a network different than the network 20 which can include a LAN, a WAN, a VPN, or a combination thereof. The purpose of the third server 24 within the system 10 will be described in greater detail below.

The first server 18 can maintain, with one of hardware, software or a combination of hardware and software, a plurality of transaction middleware (TM) sub-modules that are utilized to process financial transactions. TM sub-modules can operate in a group that defines a TM module or bounded context. Similarly, TM modules can operate in a group that defines a TM super-module. TM sub-modules, TM modules, and TM super-modules can be maintained on and executed by the exemplary first server 18. The system 10 applies the various TM sub-modules, modules, and super-modules according to principles of Domain-driven design. Each TM super-module defines a domain.

Figure 2:
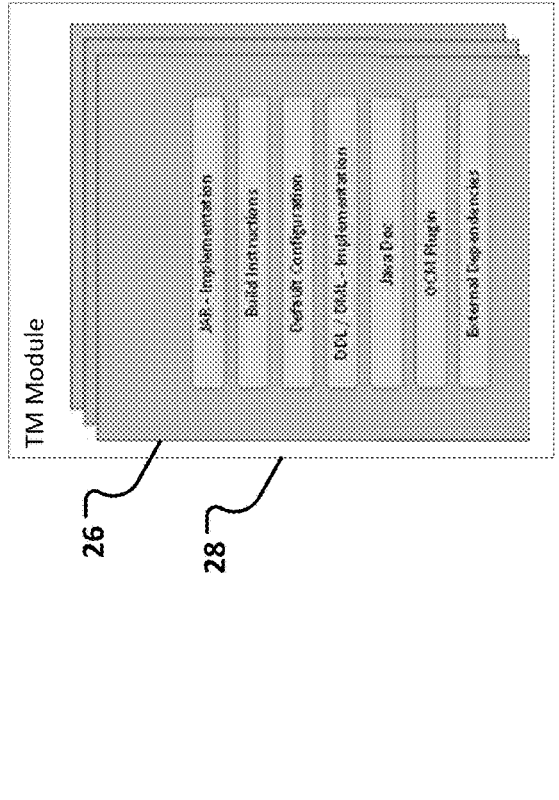
FIG. 2 is a schematic functional block diagram of a TM sub-module of the exemplary embodiment of the present disclosure.

FIG. 2 is a schematic functional block diagram of a TM sub-module 26 of the exemplary embodiment of the present disclosure. Each TM sub-module is configured to execute a discrete secondary sub-task of a financial transaction request. The exemplary TM sub-module 26 includes a fully functional and stand-alone JAVA application. A Java application is a computer program or application written in the object-oriented programming language called JAVA. The exemplary TM sub-module 26 also includes build instructions, a default configuration, a Data Definition Language (DDL)/Data Manipulation Language (DML) implementation, a JAVA document, an OCM plugin, and dependency management information.

The exemplary first server 18 can maintain and execute a plurality of different TM sub-modules, including, by way of example and not limitation, TM modules that perform the following functions: a "BIN" TM Module can classify card products and can manage individual card product authentication as well as financial and security policies; a "Crypt" TM Module can provide key store management and key service, remote key loading, zone key management, and issuer key services; and a "Transaction Log" TM Module can provide secure transaction logging and various post transaction services. In an exemplary system 10, there can be about five hundred TM sub-modules.

Figure 3:
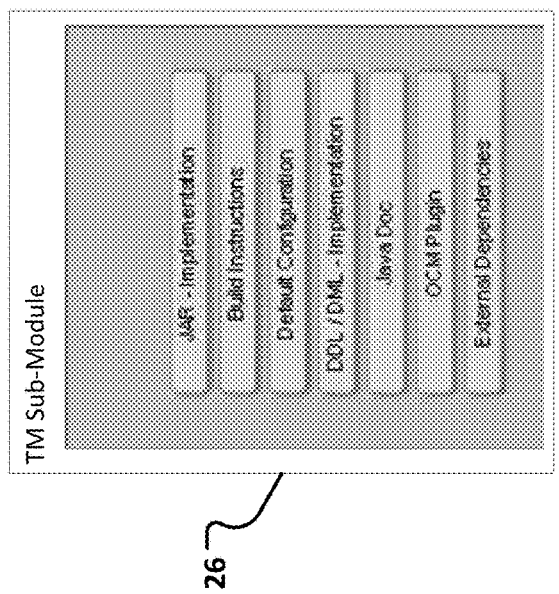
FIG. 3 is a schematic functional block diagram of a TM module of the exemplary embodiment of the present disclosure.

The first server 18 can also maintain, with one of hardware, software or a combination of hardware and software, a plurality of TM modules (or bounded contexts) that are utilized to process financial transactions. Each TM module is configured to execute a discrete primary sub-task of a financial transaction, wherein a primary sub-task is completed by the execution of at least two secondary sub-tasks. FIG. 3 is a schematic functional block diagram of a TM module 28 of the exemplary embodiment of the present disclosure. The exemplary TM module 28 includes at least two of the plurality of TM sub-modules.

The exemplary first server 18 can include a TM module designated "device handler" that manages the channel specific connection capabilities and message formats. Incoming requests can be translated into standardized message formats to be consumed by any following TM modules in the processing chain followed for the execution of a financial transaction. The exemplary first server 18 can include a TM module designated "Authorization Router" for routing decisions. The exemplary first server 18 can also include a BIN TM module, a Transaction Log TM Module, and a Crypt TM module. The exemplary first server 18 can include a TM module designated "Token Vault" that manages tokens. The exemplary first server 18 can include a TM module designated "Crypt" for key store management and key service, remote key loading, zone key management and issuer key services. The exemplary first server 18 can include a TM module designated "Account" for financial authorization of on-us transactions in real-time. The exemplary first server 18 can include a TM module designated "Channel [payment schema]" to manage one or multiple connections and to support incoming (issuing) and outgoing (acquiring) traffic.

Figure 4:
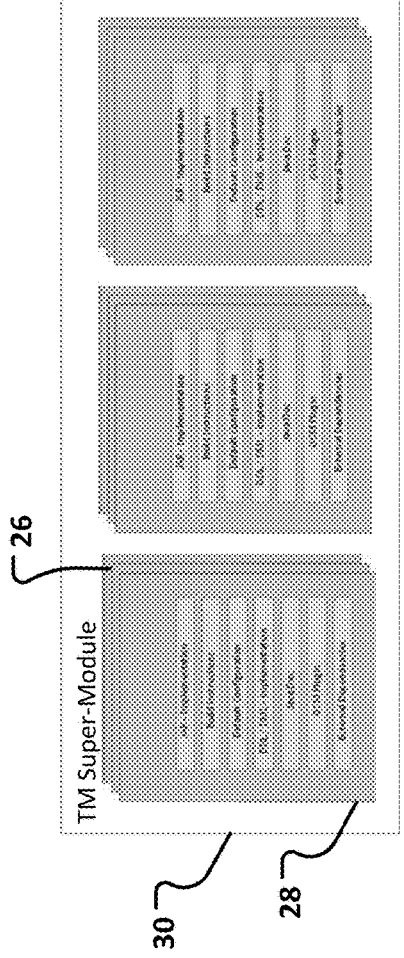
FIG. 4 is a schematic functional block diagram of a TM super-module of the exemplary embodiment of the present disclosure.

The first server 18 can also maintain, with one of hardware, software or a combination of hardware and software, at least one TM super-module 30 comprising a plurality of TM modules. Each TM super-module is configured to execute at least part of a financial transaction by the execution of at least two primary sub-tasks. FIG. 4 is a schematic functional block diagram of the TM super-module 30 of the exemplary embodiment of the present disclosure. The exemplary TM super-module 30 includes at least two of the plurality of TM modules. A TM super-module in the exemplary embodiment defines a functional domain.

Figure 5:
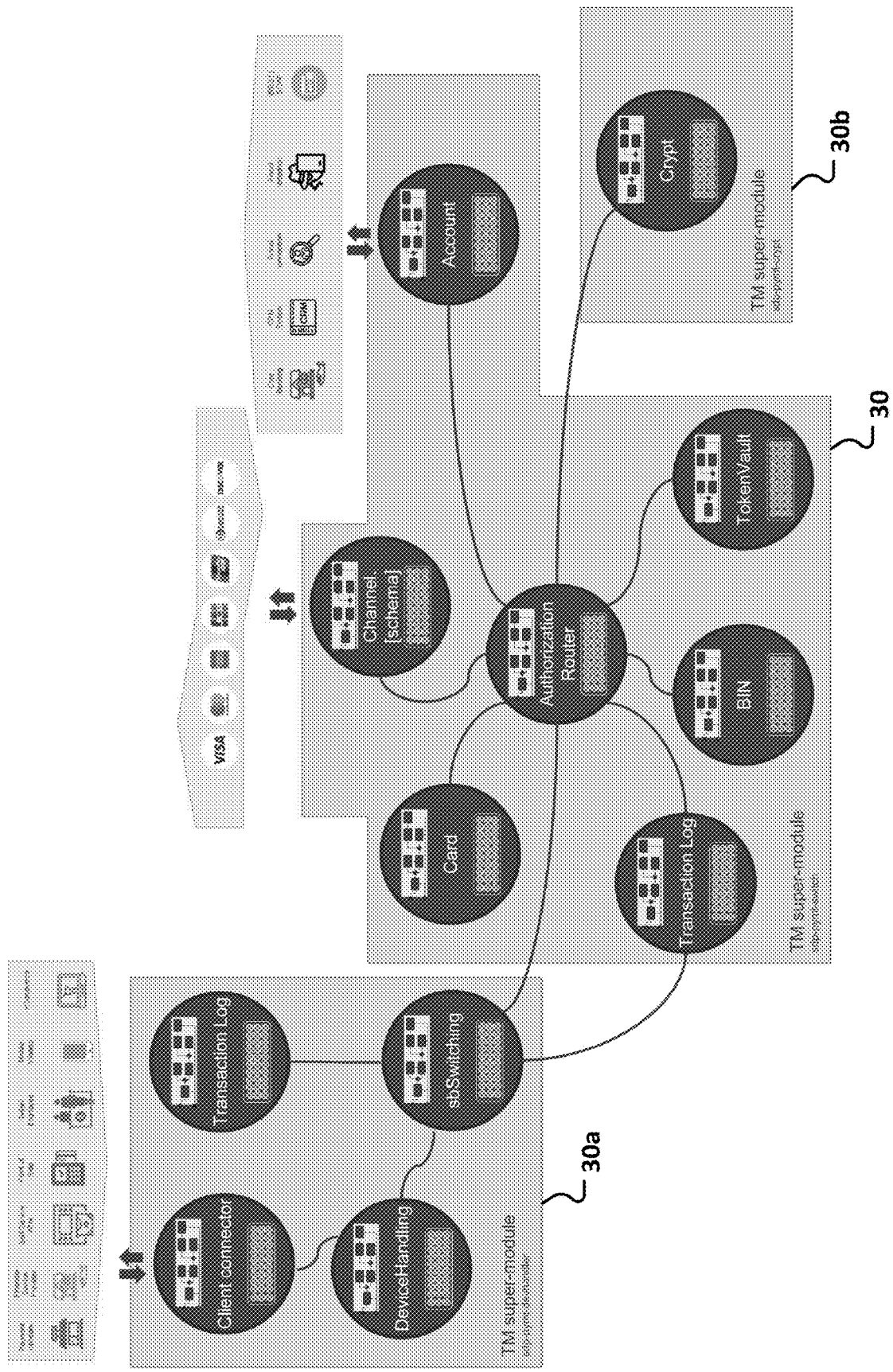
FIG. 5 is a schematic functional block diagram of a plurality of TM super-modules of the exemplary embodiment of the present disclosure.

FIG. 5 is a schematic functional block diagram of a plurality of TM super-modules 30, 30*a*, 30*b* of the exemplary embodiment of the present disclosure. The exemplary TM super-module 30 has been designated sdp-pymt-switch and includes TM modules Card, Channel, Transaction Log, Bin, Token Vault, Account, and Authorization Router. The TM module Channel is configured to communicate with external networks/schemes that can authorize financial transaction requests. The TM module Account is configured to communicate with internal services. The exemplary TM super-module 30*a* has been designated sdp-pymt-devhandler and includes TM modules Transaction Log, Client connector, DeviceHandling, and sbSwitching. The TM module Client connector is configured to communicate with external devices such as the personal computing device 12, the POS device 14, and the ATM 16, which transmit financial transaction requests. The exemplary TM super-module 30*b* has been designated sdp-pymt-crypt and includes TM module Crypt.

Figure 6:
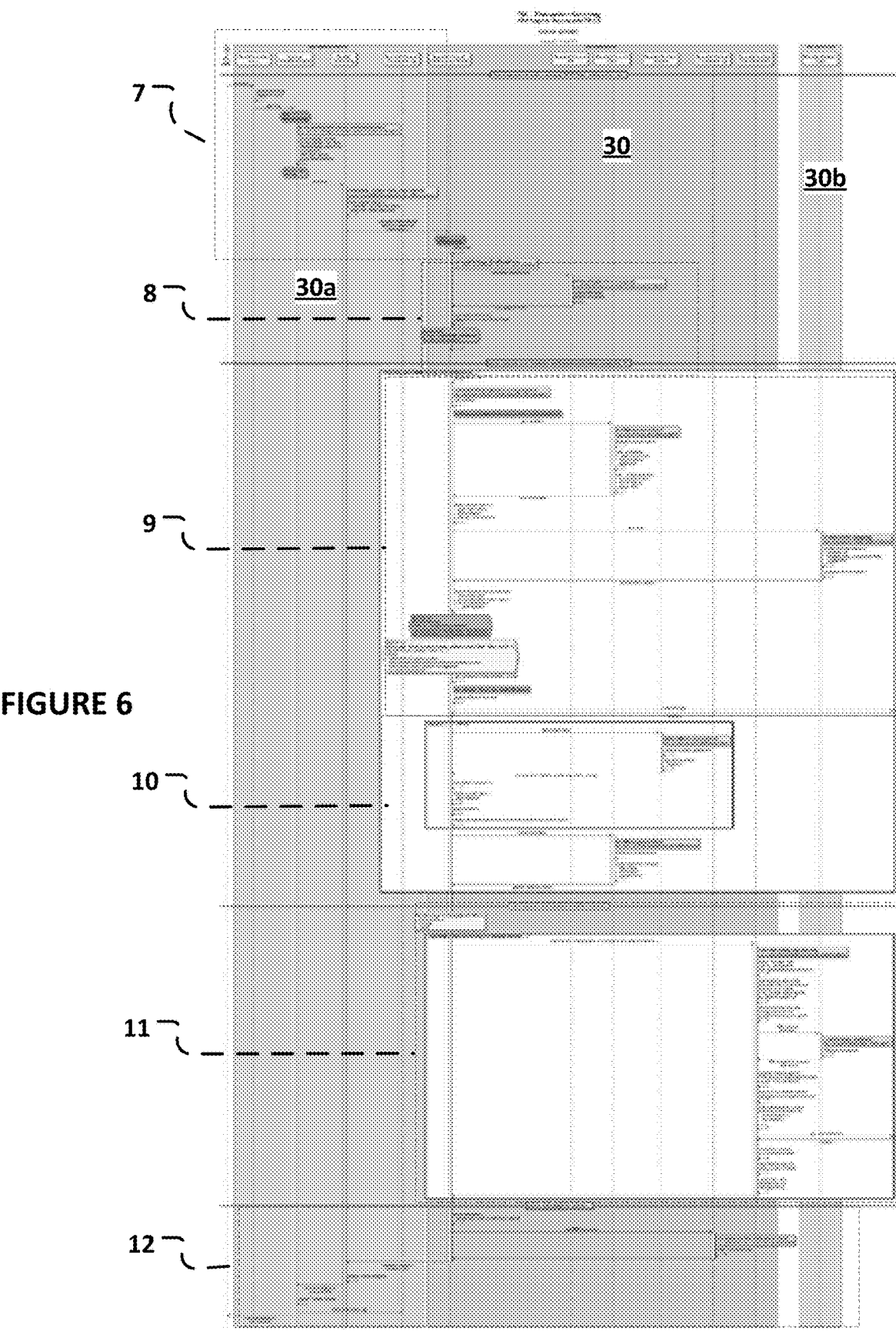
FIG. 6 is a schematic flow diagram of exemplary actions performed by the plurality of TM super-modules of the exemplary embodiment of the present disclosure.

FIG. 6 is a schematic flow diagram of exemplary actions performed by the plurality of TM super-modules of the exemplary embodiment of the present disclosure. FIGS. 7-12 are enlarged portions of FIG. 6 and are respectively referenced in FIG. 6. FIGS. 6-12 detail the process flow when the financial transaction request is an ATM cash withdrawal.

Figure 7:
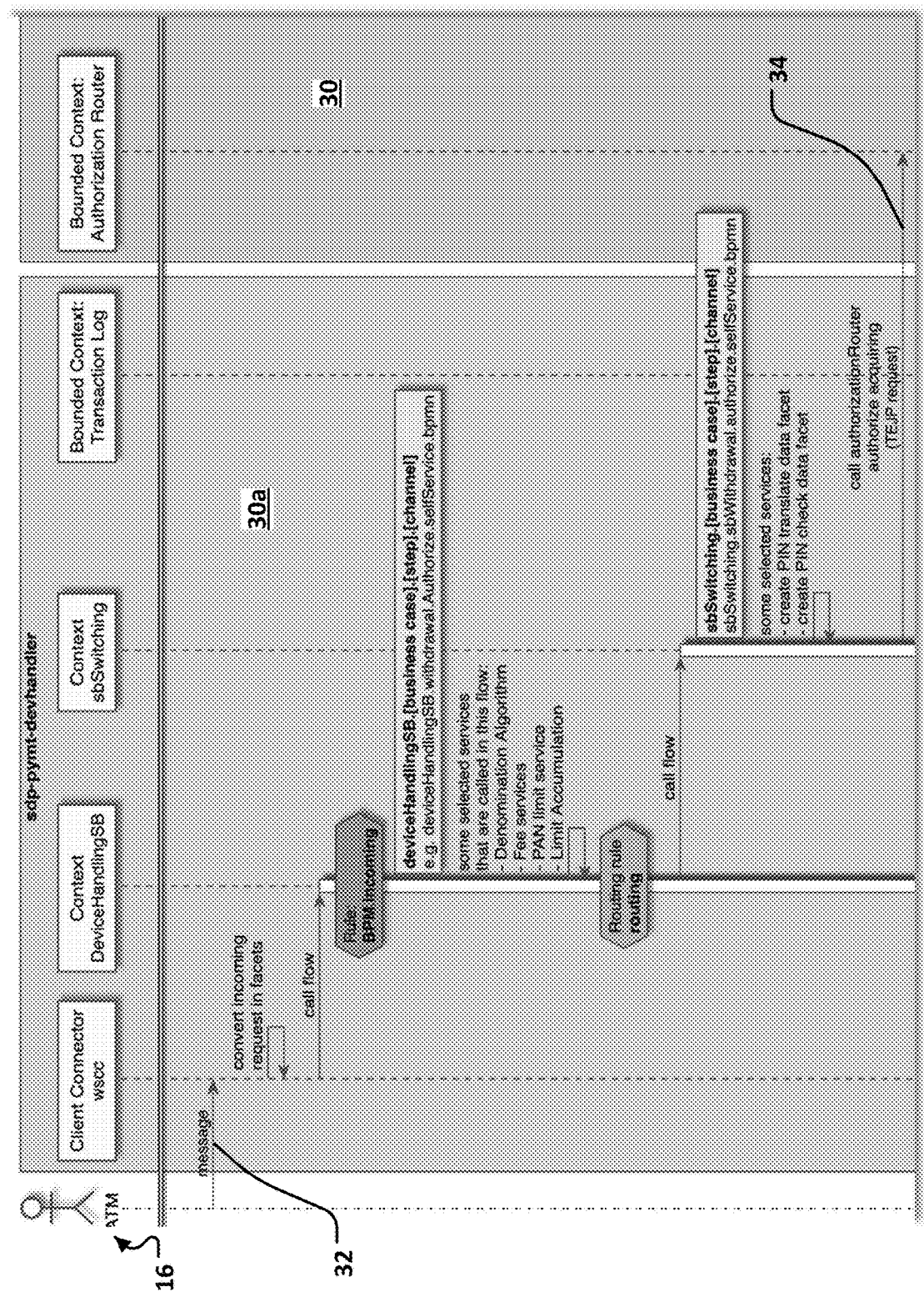
FIGS. 7-12 are enlarged portions of FIG. 6 and are respectively referenced in FIG. 6.

FIG. 7 shows the initial steps of the process wherein the ATM 16 transmits a financial transaction request (a request for permission for the ATM 16 to dispense currency) to the TM super-module 30*a*. This transmission is referenced at 32. The financial transaction request 32 is received by the TM module Client connector and, after initial processing, is transmitted to the TM module DeviceHandling for further processing. The financial transaction request 32, as processed by the TM modules Client connector and Device-Handling, is then transmitted to the TM module sbSwitching. The financial transaction request 32 is further processed and then transmitted to the TM super-module 30, specifically the TM module Authorization Router. This transmission is referenced at 34.

Figure 8:
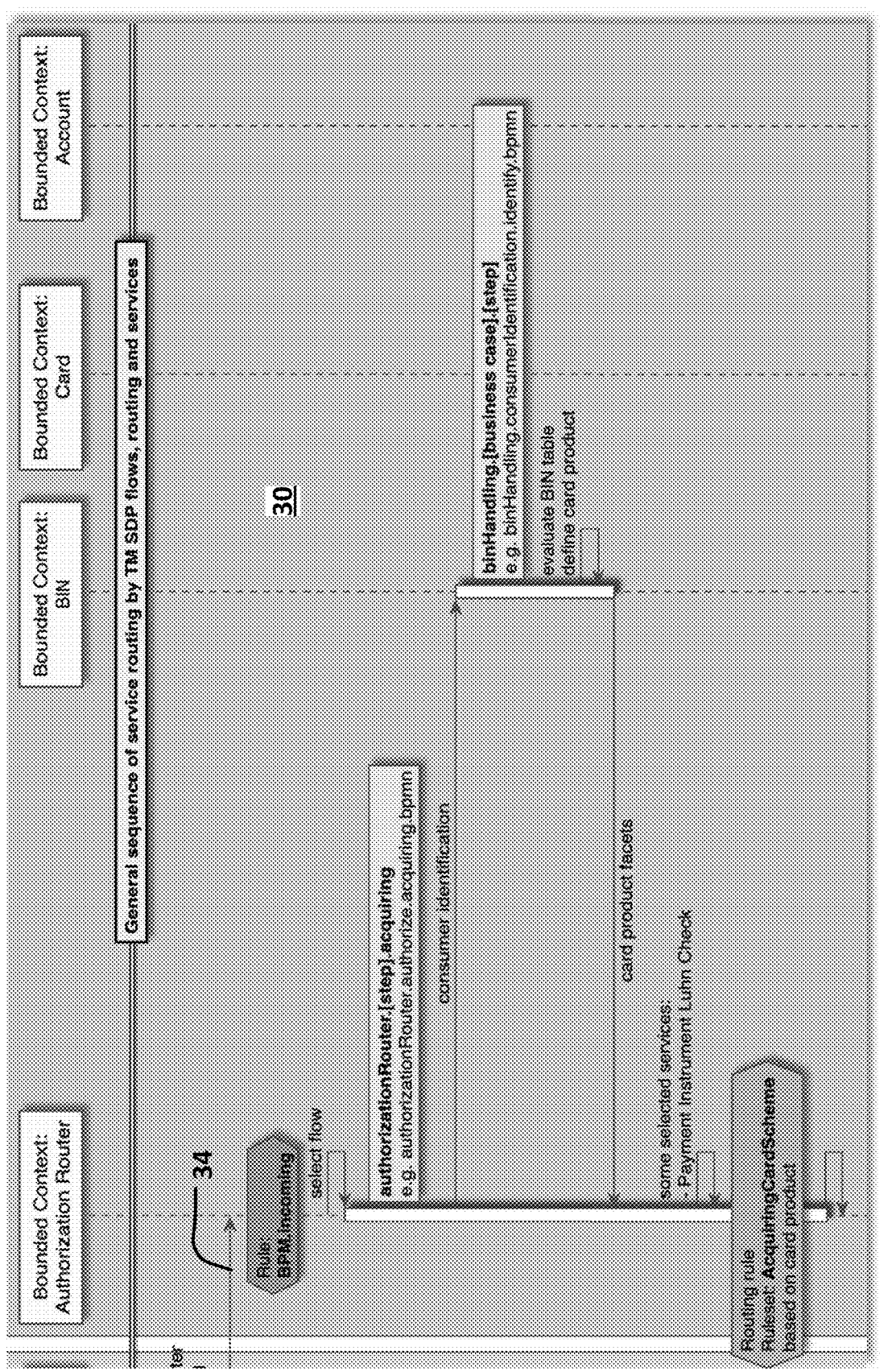

FIG. 8 shows subsequent steps of the process wherein the TM module Authorization Router of the TM super-module 30 receives the transmission 34. The TM module Authorization Router processes the financial transaction request and transmits the financial transaction request for further processing to the TM module BIN of the TM super-module 30. The TM module BIN executes processing and returns the financial transaction request to the TM module Authorization Router for further processing.

Figure 9:
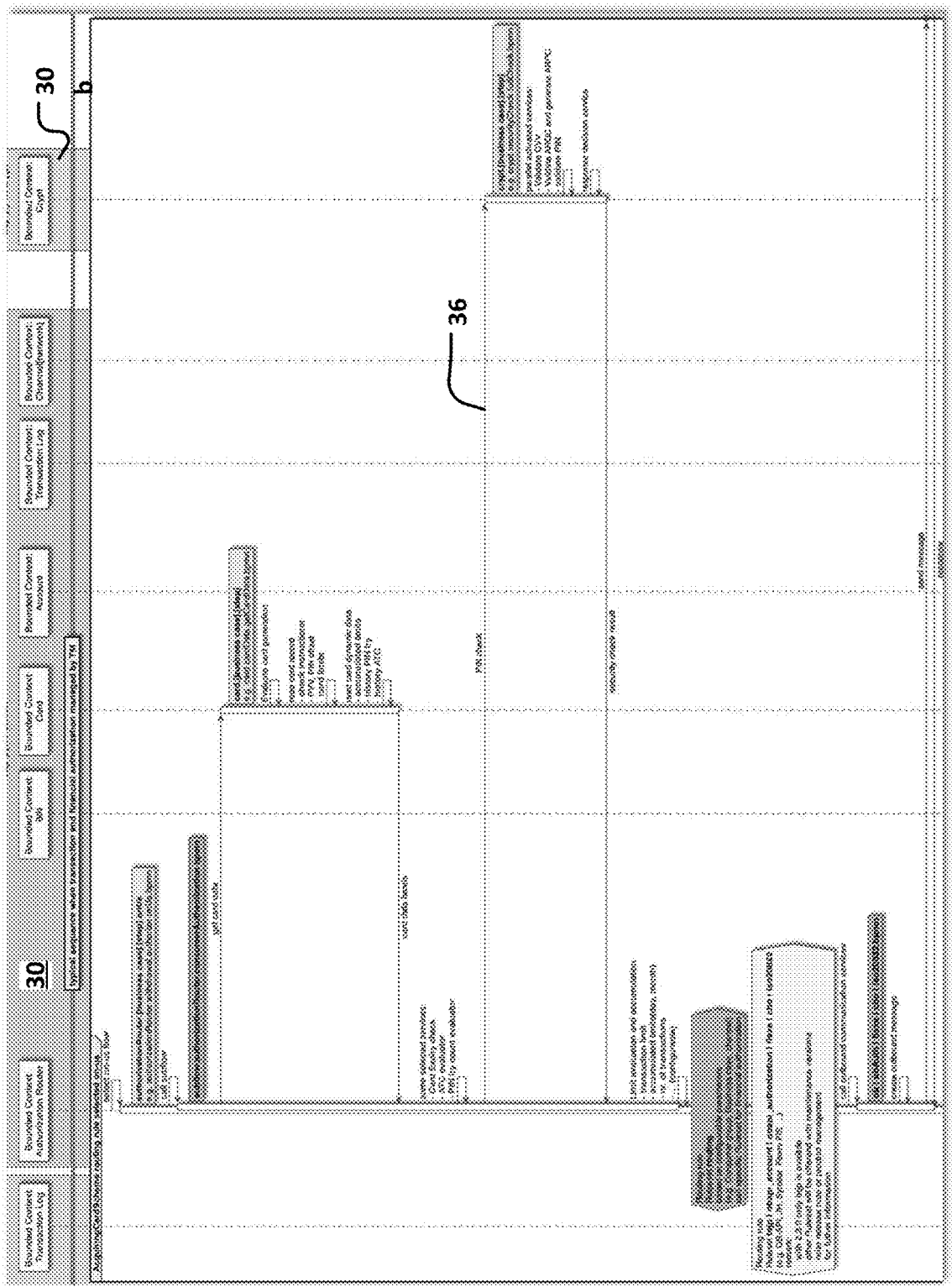

FIG. 9 shows further subsequent steps of the process performed by the TM super-module 30. The TM module Authorization Router processes the financial transaction request and transmits the financial transaction request for further processing to the TM module Card of the TM super-module 30. The TM module Card executes processing and returns the financial transaction request to the TM module Authorization Router for further processing. The TM module Authorization Router processes the financial transaction request and transmits the financial transaction request for further processing to the TM module Crypt of the TM super-module 30*b*. This transmission is referenced at 36. The TM module Crypt executes processing and returns the financial transaction request to the TM module Authorization Router for further processing.

Figure 10:
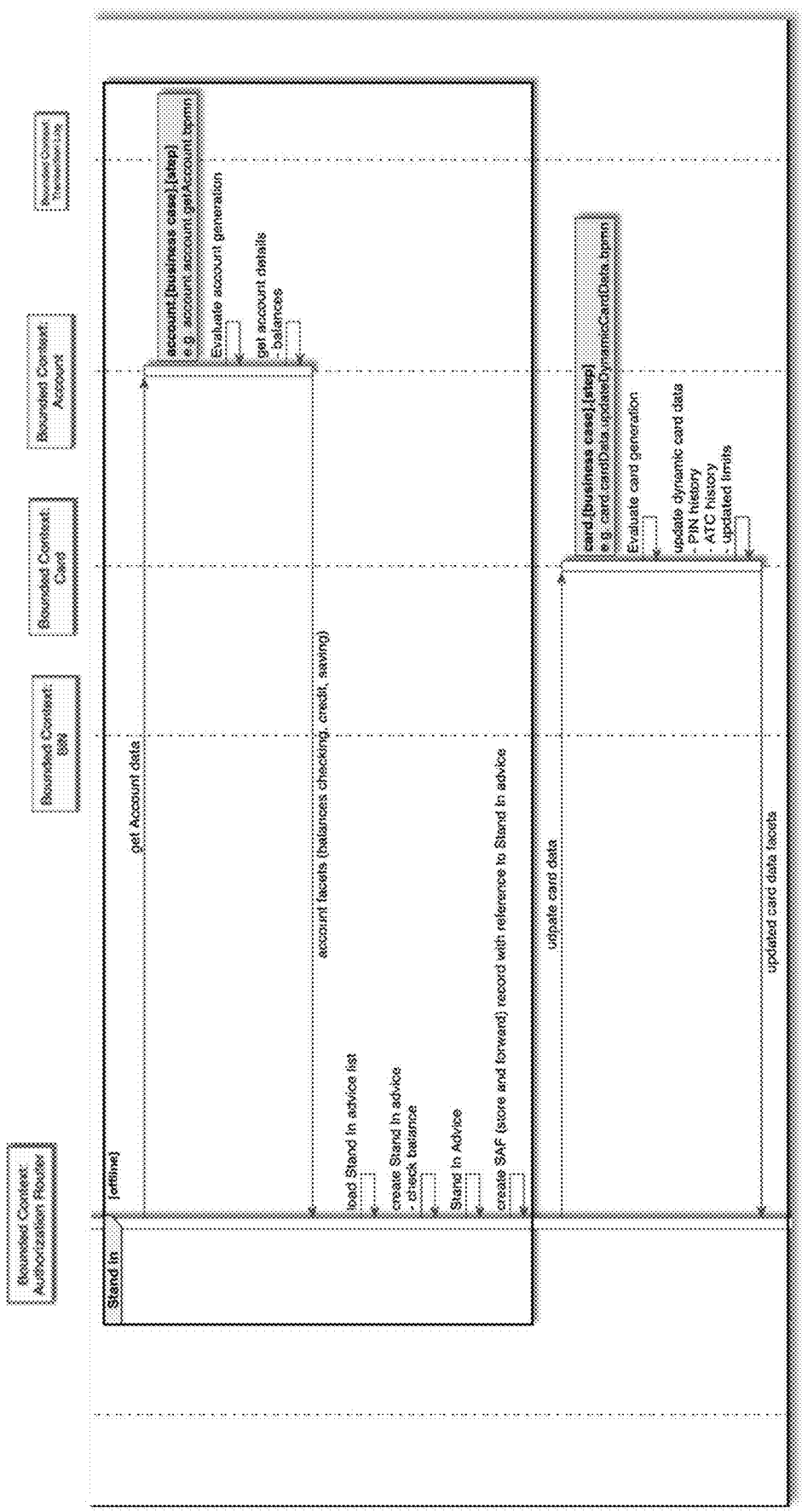

FIG. 10 shows further subsequent steps of the process performed by the TM super-module 30. The TM module Authorization Router transmits the financial transaction request for further processing to the TM module Account of the TM super-module 30. The TM module Account processes the financial transaction request and transmits the financial transaction request for further processing back to the TM module Authorization Router. The TM module Authorization Router then transmits the financial transaction request for further processing to the TM module Card of the TM super-module 30. The TM module Card processes the financial transaction request and transmits the financial transaction request for further processing back to the TM module Authorization Router.

Figure 11:
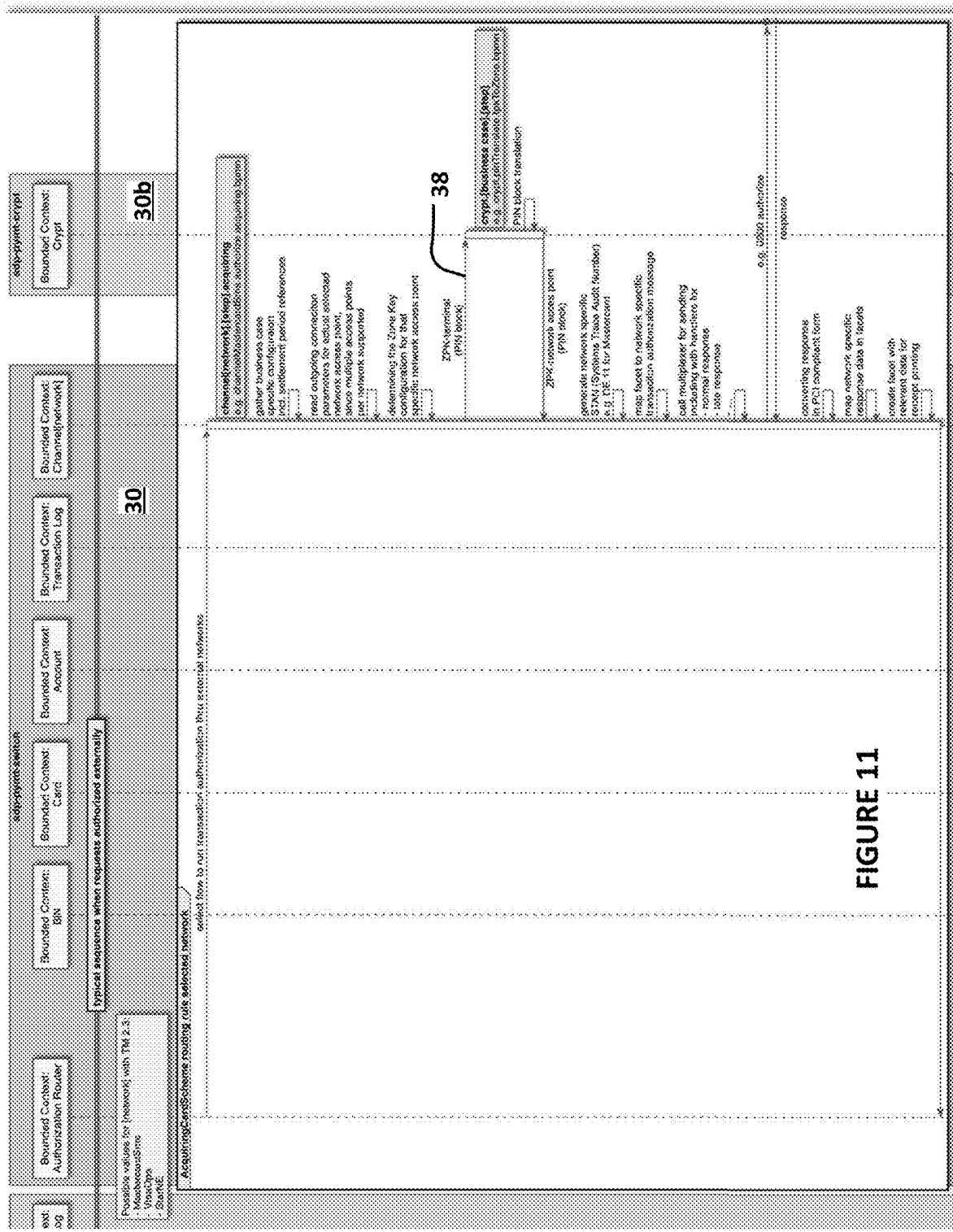

FIG. 11 shows further subsequent steps of the process performed by the TM super-modules 30 and 30*b*. The TM module Authorization Router transmits the financial transaction request for further processing to the TM module Channel of the TM super-module 30. The TM module Channel processes the financial transaction request and transmits the financial transaction request for further processing to the TM module Crypt of the TM super-module 30*b*. This transmission is referenced at 38. The TM module Crypt executes processing and returns the financial transaction request to the TM module Channel for further processing.

Figure 12:
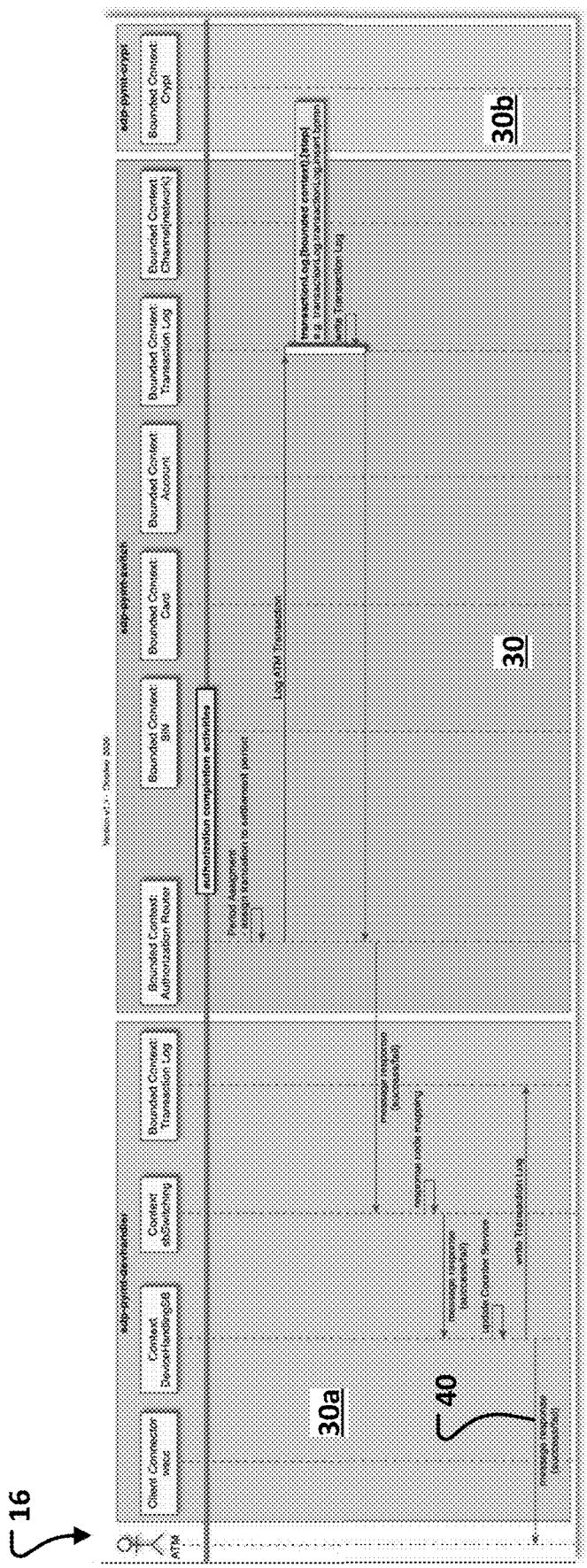

FIG. 12 shows further subsequent steps of the process performed by the TM super-modules 30 and 30*a*. The TM module Authorization Router transmits the financial transaction request for further processing to the TM module Transaction Log. The TM module performs processing on the financial transaction request and transmits the financial transaction request back to the TM module Authorization Router. The TM module Authorization Router performs processing on the financial transaction request and transmits the financial transaction request to the TM module sbSwitching of the TM super-module 30*a*. The TM module sbSwitching performs processing on the financial transaction request and transmits the financial transaction request to the TM module DeviceHandlingSB. The TM module DeviceHandlingSB transmits approval to dispense currency to the ATM 16 at 40.

Figure 13:
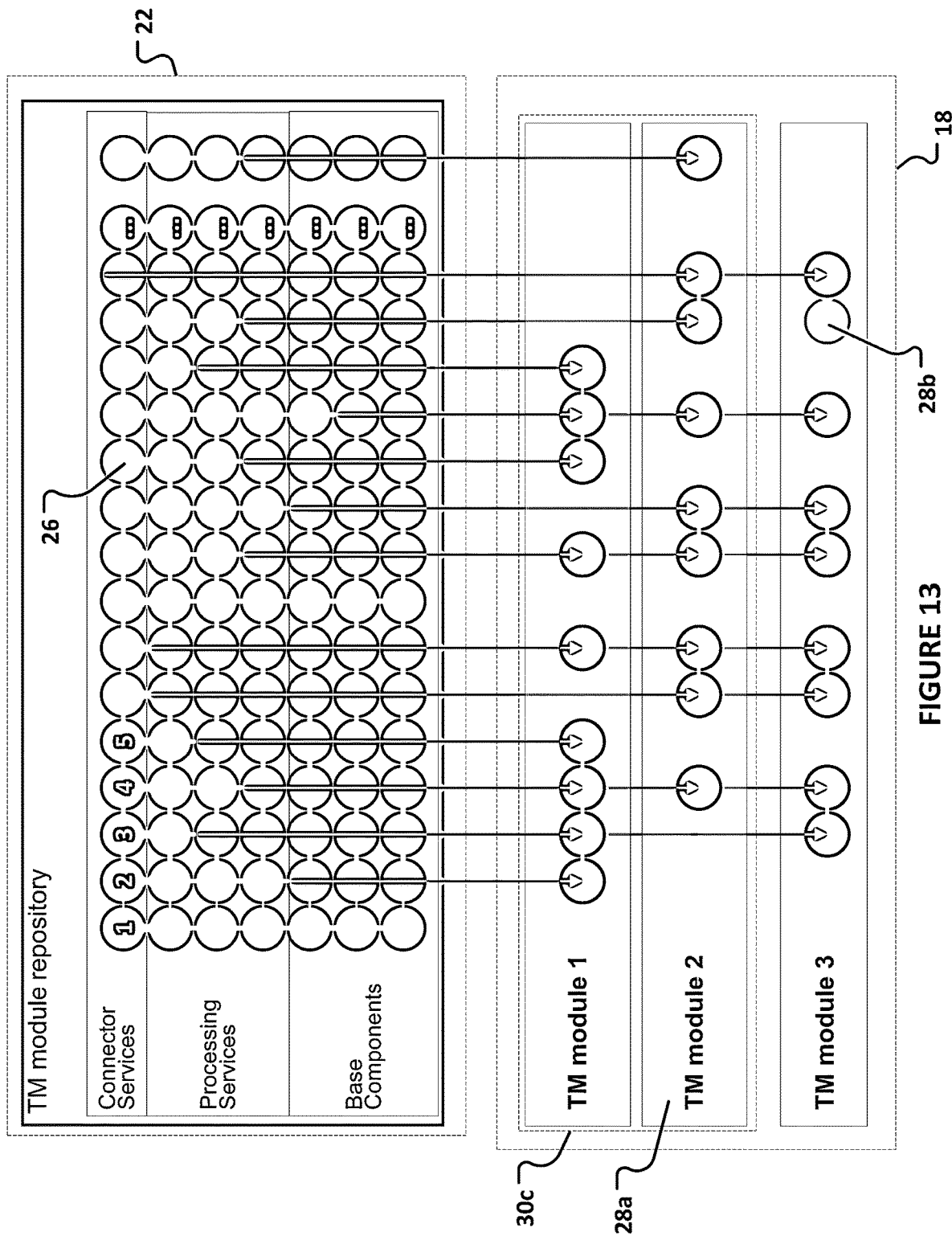
FIG. 13 is a schematic functional block diagram of TM sub-modules and TM modules transferred between computing devices.

FIG. 13 is a schematic functional block diagram of TM sub-modules and TM modules transferred between the first server 18 and the second server 22. As set forth above, the exemplary first server 18 can be operated by a financial institution and be configured to operate as a bank core. In FIG. 13, the circles represent individual TM sub-modules, such as referenced at 26. Upon startup of the system 10 and throughout operation of the system 10, the operator of the first server 18 can extract TM sub-modules as desired to build TM modules and TM super-modules and to enhance or modify TM modules and TM super-modules. In FIG. 13, an exemplary TM module assembled by the first server 18 is referenced at 28*a* and an exemplary TM super-module assembled by the first server 18 is referenced at 30*c*. The second server 22 can thus be a depository of TM modules and TM super-modules. FIG. 13 shows that the second server 22 can retain TM modules and TM super-modules that facilitate connections among hardware components and software modules, processing operations, and base components.

FIG. 13 also shows a TM module 28*b* that is created by the operator of the first server 18 and not extracted from the second server 22. The system 10 thus accommodates customization.

The first server 18 can define a particular operational capacity. By way of example and not limitation, the first server 18 may be able to process a particular number of financial transaction requests concurrently. During operation, first server 18 can receive a frequency of financial transaction requests that exceeds its operational capacity. In response to receiving a number of financial transaction requests that exceeds the operational capacity, the first server 18 can replicate TM-supermodules on the third server 24 and direct at least portions of financial transaction requests beyond the operation capacity to the third server 24. The exemplary first server 18 can thus annex at least some memory space of the third server 24. The portion of the third server 24 annexed by the first server 18 thus allows the system to dynamically change its size in response to demand.

Figure 14:
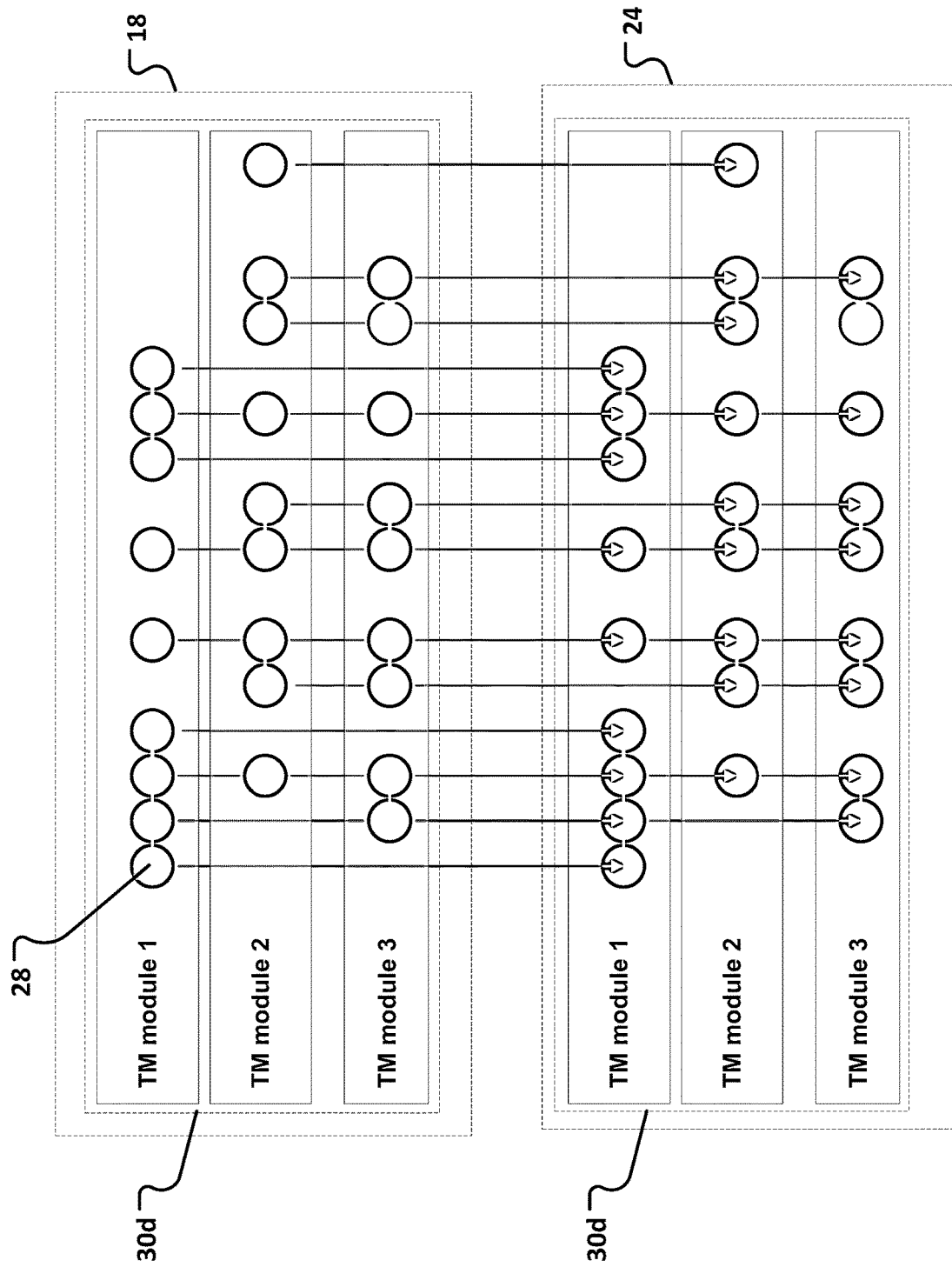
FIG. 14 is a schematic functional block diagram of TM super-modules transferred between computing devices.

FIG. 14 is a schematic functional block diagram of TM super-modules transferred between the first server 18 and the third server 24. A TM super-module 30*d* stored and operated on the first server 18 is replicated and then operated on the third server 24. Upon the completion of processing of received financial transaction requests, the exemplary third server 24 can erase the memory sections storing the transferred TM super-modules. The exemplary first server 18 thus temporarily annexes at least some memory space of the third server 24.

A cloud infrastructure monitoring system can monitor the activities of the system 10 and decide when to replicate or reduce TM super modules. Kubernetes is one example of a cloud infrastructure monitoring system that can be utilized in one or more embodiments of the present disclosure.

It is noted that the system 10 annexes at least some memory space of the third server 24, in response to demand beyond capacity, per domain and not per request. Existing systems can access remote resources, such a memory space of the third server 24, in response to demand that exceeds its existing resources. Existing systems access such remote resources "per request" which means that existing systems transfer the request to the remote resource and the remote resource can service the request. The remote resource maintains the coding necessary to service any requests that are received. In contrast, in the present disclosure, the first server 18 accesses the third server 24 and annexes memory space per domain which means that the first server 18 replicates the coding needed for all TM sub-modules and TM modules for a particular TM super-module, in order to service the request on the memory of the third server 24 and also transfers the financial transaction request (as thus-far processed) to the third server 24. The third server 24 services the financial transaction request and then the memory of the third server 24 is then released for use by another system.

In an exemplary method executed by the system 10, the first server 18 can maintain, with one of hardware, software and a combination of hardware and software, a plurality of TM sub-modules such as TM sub-module 26. Each TM sub-module can be configured to execute a discrete secondary sub-task of a financial transaction request. Each TM sub-module can include a fully functional and stand-alone JAVA application, build instructions, a default configuration, a DDL/DML implementation, a JAVA document, a OCM plugin, and dependency management information. The first server 18 can also maintain a plurality of TM modules, such as TM module 28. Each TM module can include at least two of the plurality of TM sub-modules. Each TM module can be configured to execute a discrete primary sub-task of the financial transaction request. A discrete primary sub-task is completed by the execution of at least two secondary sub-tasks. The first server 18 can also maintain a plurality of TM super-modules, such as TM super-module 30. Each TM super-module can include two or more of the plurality of TM modules and each can be configured to execute at least part of the financial transaction request by the execution of at least two primary sub-tasks.

The first server 18 can receive a request to execute the financial transaction request. The first server 18 can then determine all of the TM super-modules that are required to execute the financial transaction. The first server 18 can also detect respective capacities of all of the TM super-modules that are required to execute the financial transaction.

In response to detecting that any of the TM super-modules are at maximum capacity, the first server 18 can annex control over at least some memory space of the second server 24. The first server 18 can then replicate any of the TM super-modules that are at maximum capacity on memory space of the second server. Further, the first server 18 can direct the financial transaction request (to the extent the financial transaction request is already partially processed or is fully unprocessed) to the TM super-module that was replicated on the memory annexed from the second server, for completion of at least some processing of the financial transaction request. The TM super-module replicated on the second server can complete processing of the financial transaction request. This processing may or may not complete all processing required to complete the financial transaction request. The first server 18 can receive the output and then cede control over the memory back to the second server. In response, the second server 24 can designate the memory space that previously held the TM super-module as free, usable by another server.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A method of processing a financial transaction request comprising:
  maintaining, with one of hardware, software and a combination of hardware and software, on a first server:
    a plurality of TM sub-modules, each TM sub-module configured to execute a discrete secondary sub-task of the financial transaction request and comprising:
      a fully functional and stand-alone JAVA application having:
      build instructions,
      a default configuration,
      a DDL/DML implementation,
      a JAVA document,
      a OCM plugin, and
      dependency management information,
    a plurality of TM modules each comprising at least two of the plurality of TM sub-modules and each configured to execute a discrete primary sub-task of the financial transaction request wherein the discrete primary sub-task is completed by the execution of at least two secondary sub-tasks, and
    a plurality of TM super-modules each comprising two or more of the plurality of TM modules and each configured to execute at least part of the financial transaction request by the execution of at least two primary sub-tasks;
  receiving, at the first server, a request to execute the financial transaction request;
  determining, with the first server, all TM super-modules required to execute the financial transaction;
  detecting, with the first server, respective capacities of all of the TM super-modules required to execute the financial transaction as determined in said determining;
  annexing, with the first server, in response to said detecting, control over at least some memory space of a second server physically remote from the first server;
  replicating, with the first server, in response to said detecting, on the at least some of the memory space annexed on the second server, at least one of the TM super-modules required to execute the financial transaction as determined in said determining;
  directing, with the first server, the financial transaction request to the at least one TM super-module replicated on the at least some of the memory space annexed on the second server for completion of at least one primary sub-task;
  completing the at least one primary sub-task, on the second server, with the at least one TM super-module replicated on the at least some of the memory space annexed on the second server and generating a corresponding output;
  receiving, with the first server, from the second server, the output corresponding to completion of the at least one primary sub-task; and
  ceding, with the first server, control over the at least some of the memory space annexed on the second server back to the second server after and in response to said receiving the output.

2. The method of claim 1 further comprising:
  designating, with the second server, the at least some of the memory space as free in response to said ceding.

3. The method of claim 1 wherein said replicating is further defined as:
  replicating, with the first server, in response to said detecting, on the at least some of the memory space annexed on the second server, at least one of the TM super-modules required to execute the financial transaction as determined in said determining, whereby said replicating is performed per domain and not per request.

4. A system for processing a financial transaction request comprising:
  a first server maintaining, with one of hardware, software and a combination of hardware and software:
    a plurality of TM sub-modules, each TM sub-module configured to execute a discrete secondary sub-task of the financial transaction request and comprising:
      a fully functional and stand-alone JAVA application,
      build instructions,
      a default configuration,
      a DDL/DML implementation,
      a JAVA document,
      a OCM plugin, and
      dependency management information,
    a plurality of TM modules each comprising at least two of the plurality of TM sub-modules and each configured to execute a discrete primary sub-task of the financial transaction request wherein the discrete primary sub-task is completed by the execution of at least two secondary sub-tasks, and
    a plurality of TM super-modules each comprising two or more of the plurality of TM modules and each configured to execute at least part of the financial transaction request by the execution of at least two primary sub-tasks each of the TM super-modules;
  a second server physically remote from the first server; and
  wherein said first server and said second server are configured to:
    receive, with the first server, a request to execute the financial transaction request;
    determining, with the first server, all TM super-modules required to execute the financial transaction;
    detect, with the first server, respective capacities of all of the TM super-modules required to execute the financial transaction as determined in said determining;
    annex, with the first server, in response to said detecting, control over at least some memory space of the second server;
    replicate, with the first server, in response to said detecting, on the at least some of the memory space annexed on the second server, at least one of the TM super-modules required to execute the financial transaction as determined in said determining;
    direct, with the first server, the financial transaction request to the at least one TM super-module replicated on the at least some of the memory space annexed on the second server for completion of at least one primary sub-task;
    complete the at least one primary sub-task, on the second server, with the at least one TM super-module replicated on the at least some of the memory space annexed on the second server and generating a corresponding output;
    receive, with the first server, from the second server, the output corresponding to completion of the at least one primary sub-task; and cede, with the first server, control over the at least some of the memory space annexed on the second server back to the second server after and in response to said receiving the output.

5. The system of claim 1 wherein the replicating by said first server is further defined as:

replicate, with the first server, in response to said detecting, on the at least some of the memory space annexed on the second server, at least one of the TM supermodules required to execute the financial transaction as determined in said determining, whereby said replicating is performed per domain and not per request.

\* \* \* \* \*